UNITED STATES PATENT OFFICE.

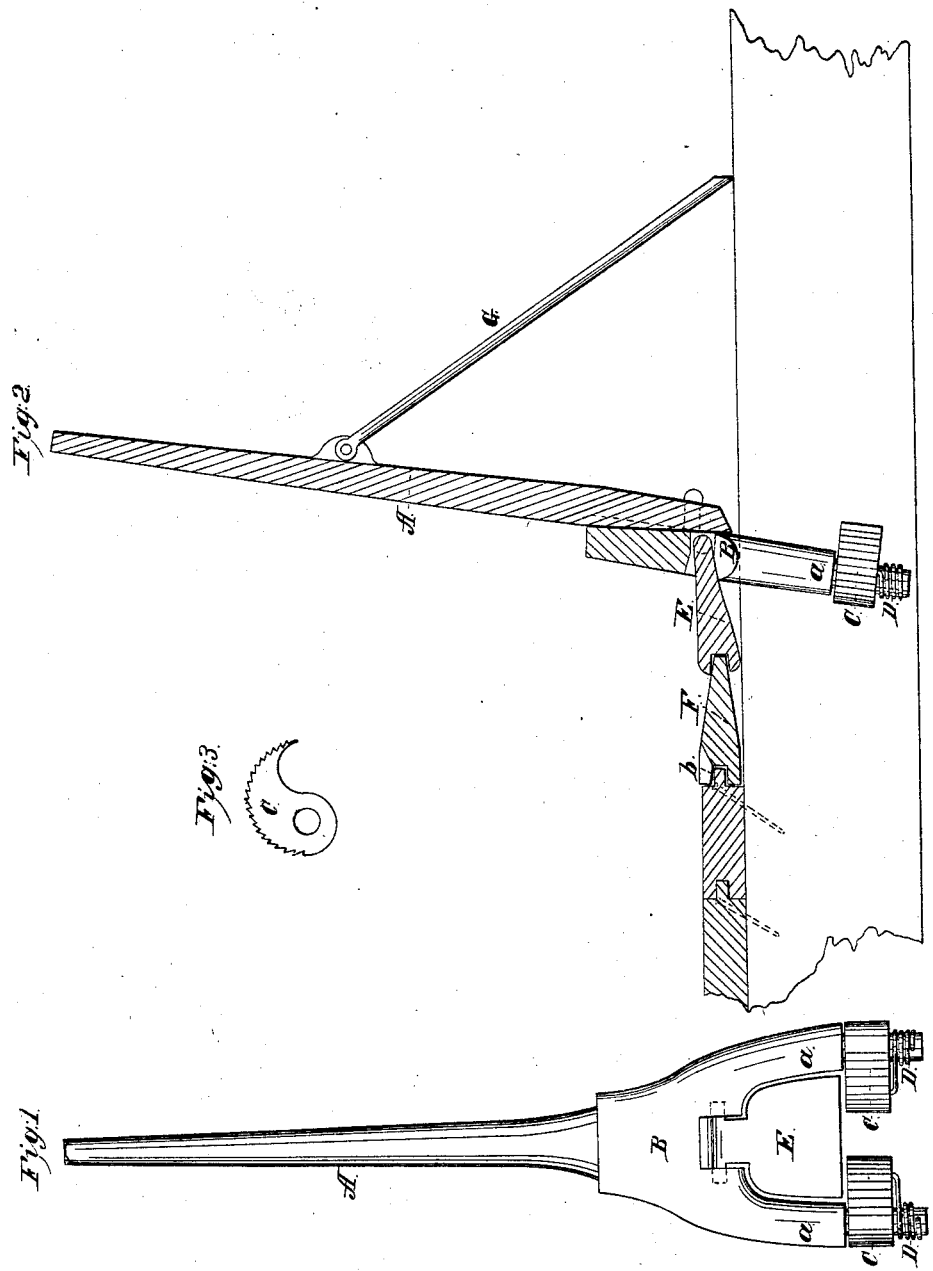

AARON LLOYD, OF MATTOON, ILLINOIS, ASSIGNOR TO FRANCIS HAMBLIN.

IMPROVEMENT IN FLOOR-CLAMPS.

Specification forming part of Letters Patent No. 55,424, dated June 5, 1866.

*To all whom it may concern:*

Be it known that I, AARON LLOYD, of Mattoon, in the county of Coles and State of Illinois, have invented a new and useful Improved Flooring-Jack; and I do hereby declare that the following is a full, clear, and exact description thereof, which will enable those skilled in the art to make and use the same, reference being had to the accompanying drawings, forming part of this specification, in which—

Figure 1 is a side elevation of my invention. Fig. 2 is a vertical central section, showing the application of the device. Fig. 3 is a top view of one of the cams detached.

Similar letters of reference indicate corresponding parts.

My invention is designed for placing flooring together as the boards are being laid; and it consists in the employment of a lever having a bifurcated head, each fork carrying a serrated cam for clasping the joist, the said lever being provided with a tongue or tongues for crowding up the boards and a prop for holding the device rigidly while the boards are being nailed.

To enable others to understand my invention, I will proceed and describe the same.

A represents the handle of the device, and B the head thereof. This latter has a forked end, *a a*, and each tine carries a serrated cam, C, as shown in Fig. 1. The shape of this cam C is shown more particularly in Fig. 3. D is a spring applied to the forks *a* of the device and to the cams C, for causing the said cams to bear with greater force against the joist, which is straddled by the bifurcated head B. In the present instance the head B is made separate from the handle A and the handle is attached to it; but both can be made in one piece, if desired, the whole constituting a lever having a bifurcated head.

E is a tongue, which is pivoted or attached to the head B in any suitable way. It is illustrated in the drawings as having two journals which are slipped in their bearings in the head at the back thereof, and the handle thrust down through a staple to keep them in place. To this tongue E is attached a secondary tongue, F, (see Fig. 2,) one end of which, in the present instance, lies in a groove in the tongue E, and the other has a groove along its edge, for use where tongued boards are used, into which the tongue of the board fits, as shown in Fig. 2, and this secondary tongue has a groove, *b*, made in its face to enable the nails to be driven when the nails are "secretly nailed," as it is termed, all of which will be understood by reference to Fig. 2.

G (see Fig. 2) is a prop pivoted to the handles A for keeping the device from slipping after the board has been pressed up and is being nailed.

To use the jack, place the forks *a a* across the joist or beam and allow the prop to rest upon the joist; extend the tongue so that the secondary one will bear against the edge of the board to be laid; then work the jack up to it by a back-and-forth motion of the lever. When the board has been pushed up tightly set the prop and the board will be held while being nailed.

The device is simple and easily operated and will perform its work with perfect satisfaction.

What I claim as new, and desire to secure by Letters Patent, is—

Hinging the prop G to the handle A when used for the purpose of a floor-clamp, constructed and operating in the manner as herein represented and described.

The above specification of my invention signed by me this 2d day of September, 1865.

AARON LLOYD.

Witnesses:
F. HAMBLIN,
R. P. A. HAMILTON.